N. A. WIDGREN.
CLUTCH CONTROLLER.
APPLICATION FILED JULY 9, 1913.
1,204,525.
Patented Nov. 14, 1916.
2 SHEETS—SHEET 2.
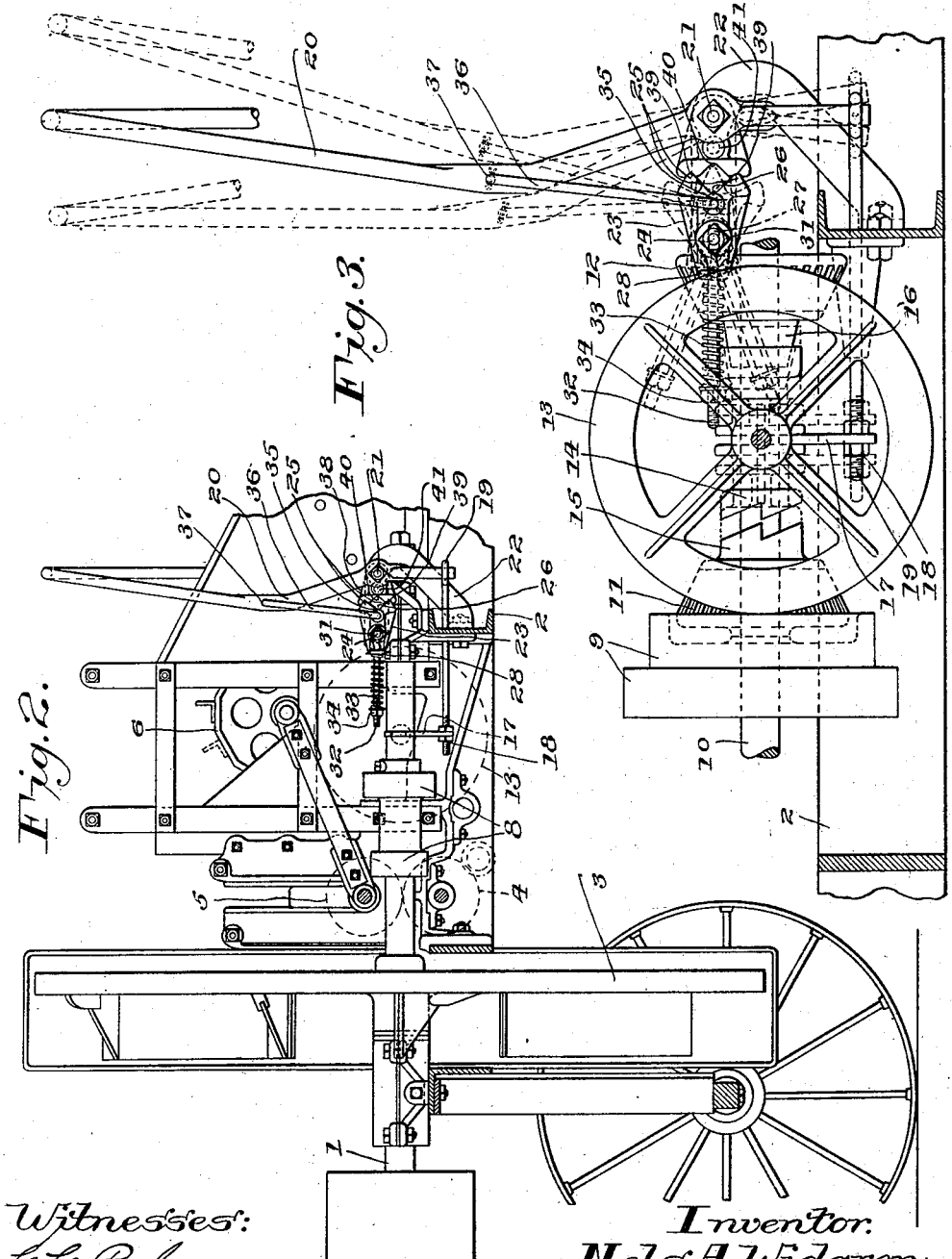

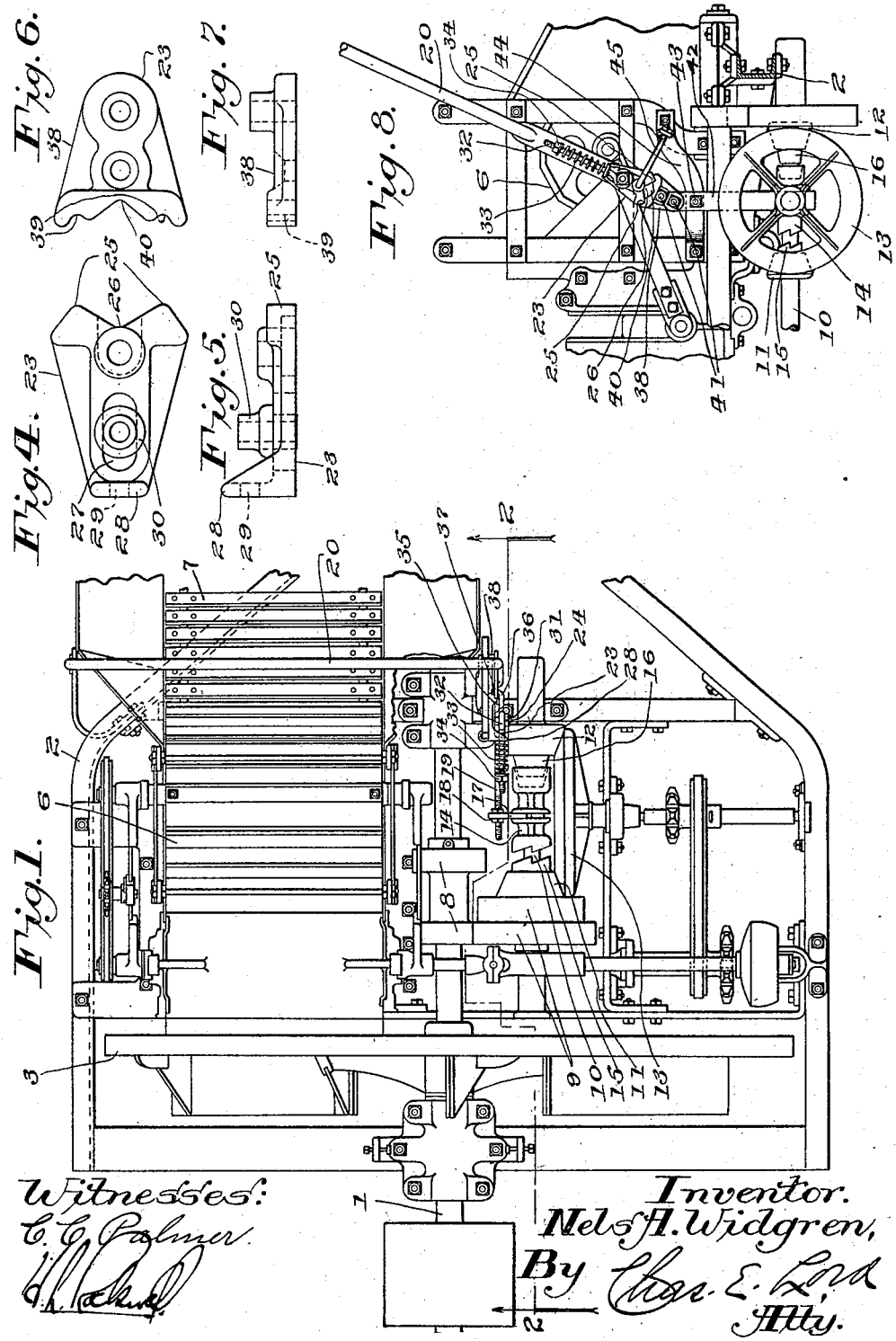

UNITED STATES PATENT OFFICE.

NELS A. WIDGREN, OF CHICAGO, ILLINOIS, ASSIGNOR TO INTERNATIONAL HARVESTER COMPANY OF NEW JERSEY, A CORPORATION OF NEW JERSEY.

CLUTCH-CONTROLLER.

1,204,525.   Specification of Letters Patent.   Patented Nov. 14, 1916.

Application filed July 9, 1913. Serial No. 778,052.

*To all whom it may concern:*

Be it known that I, NELS A. WIDGREN, a citizen of the United States, residing at Chicago, in the county of Cook and State of Illinois, have invented certain new and useful Improvements in Clutch-Controllers, of which the following is a full, clear, and exact specification.

My invention relates to clutch controllers. It has heretofore been proposed to provide the feeding mechanism of an ensilage cutter with forward and reverse clutch connections of the positive and frictional type respectively, and clutch controlling mechanism adapted to move this clutch mechanism to the desired position; this controlling mechanism being positively locked against movement when the clutch member reaches the neutral position as it is moved from the frictional or reverse position to the positive or forward position in order to prevent damage to the driving mechanism due to the jars incident to the positive connection of the gears while the same are in rapid motion. In this construction a separate latch has been used to lock the controlling lever positively in neutral position and it has been necessary for the operator to disengage this latch by a separate manual manipulation thereof before the feeding mechanism could again be positively driven. Further, difficulty has been experienced in maintaining the clutch mechanism in its several positions, due to the vibration developed during the operation of the machine, particular difficulty being encountered in holding the clutch member in its frictional position.

My invention has for its object to control an ensilage cutter in an improved manner whereby, while the controlling mechanism is readily operable to change the clutch connections in any desired manner during the normal operation of the machine, the movement of the clutch controlling mechanism in shifting the clutch from friction reverse to positive forward position is automatically retarded while the clutch occupies the neutral position, and the clutch controlling mechanism is automatically released by movement of only the one controlling lever, the latch requiring separate manual manipulation to release the same being eliminated.

A further object of my invention is to provide improved means which serve to position the clutch mechanism more securely in each position to which it is adjusted, these means being of an improved construction adapted to withstand the jars and vibrations incident to the operation of the machine at high speeds.

I attain these objects by providing an improved controller carried on the ensilage cutter frame at a point adjacent the feeding throat and clutch mechanism thereof, comprising a latch member and an adjustable resiliently mounted latch member operatively connected to the controlling lever and movable therewith, coöperating with the first latch member to position the clutch in neutral position for the desired interval, but releasable upon a continuation or reversal of the original movement; the resiliently mounted controlling member at the same time also acting to hold the clutch member very securely in friction position and thus effectually prevent slipping.

In order that my invention may be clearly and fully disclosed, I have illustrated in the accompanying drawings two embodiments which it may assume in practice. It is here to be understood, however, that the forms shown herein for purposes of illustration may be modified without departing from the spirit of my invention.

Figure 1 is a top plan view of an ensilage cutter equipped with one embodiment of my improvement. Fig. 2 is a sectional view on line 2—2 of Fig. 1. Fig. 3 is an enlarged detail view of the controlling mechanism. Figs. 4 and 5 are plan and side elevation views of one of the coöperating controller members. Figs. 6 and 7 are similar views of other coöperating controller member. Fig. 8 is a detail view of a modified form of the construction shown in Figs. 1 to 7.

In the construction shown in Figs. 1 to 7, the main power shaft 1 of the ensilage cutter is disposed longitudinally of the machine frame 2 and carries a rotary cutter head 3 on one end of the same; coöperating feeding rolls 4, 5 and 6 and a conveyer 7 feeding the material to be cut to this cutter head. This feeding mechanism is driven from the shaft 1 through speed changing gears 8 and 9; the gears 9 being carried on a stub shaft 10 journaled in the frame parallel to the shaft 1 and carrying a plurality of spaced beveled gears 11 and 12 adapted to engage a coöperating beveled gear 13 operatively connected to the feeding mechanism to rotate this mechanism in opposite directions when a movable clutch member 14 splined to the shaft 10 is adjusted longitudinally of this shaft in such a manner that it engages with a positive clutch member 15 integral with the beveled gear 11 or a frictional clutch member 16 integral with the beveled gear 12; the feeding mechanism being thrown out of gear when the clutch member 14 occupies its middle or neutral position. This clutch member 14 is engaged by a movable clutch shipping member 17 adjustably attached at 18 to one end of a longitudinally disposed eye bolt 19 supported by the main frame and protruding therethrough. Through the eyelet on the outer end of this bolt extends the lower end of a swinging, upstanding controlling lever or U shaped bail 20 extending across the throat of the feeding mechanism and pivoted on opposite sides of the same. As shown, the end of the bail adjacent the clutch mechanism is pivoted at 21 to the peaked rear end of a V shaped bracket 22 fixed to the frame 2. At a point adjacent the free end of this bracket and on the horizontal portion thereof, a controlling or latch member 23 is attached thereto by a bolt 24. This member 23 is shown to be substantially triangular in shape (Fig. 4) and provided on its edge with a pair of peaked teeth 25 having rounded tips and a wide V shaped notch 26 between them. Further, as shown, a longitudinally extending slot 27 is provided in the narrow end of this latch member to permit the same to move longitudinally of the bracket. A lug 28 having an opening 29 extending therethrough is also formed on this end of the latch member and protruded at right angles to the body portion thereof. As illustrated in Fig. 2, the bolt 24 which attaches this member 23 to the bracket 22 extends through a flanged bushing 30 carried in the slot and is movable longitudinally of the slot with this bushing and positioned against lateral displacement, both with respect to the bushing and the member 23, by means of a suitable nut 31. Attached to this bolt 24 is the hook shaped end of an angularly adjustable longitudinally disposed eye bolt 32 extending through the opening 29 in the end of the latch member 23 toward the clutch mechanism and normally positioned with respect to the latch member, as shown in Fig. 2, by a coiled spring 33 encircling the same and positioned between a suitable adjusting nut 34 on the outer end of the bolt and the outer wall of the lug 28 on the latch member 23. Further, as shown in Fig. 2, this latch member 23 is pivotally connected at 35 to an upstanding rod 36 pivotally connected at 37 to the controlling lever or bail 20 at a point between the ends of the latter and above the pivot 21. Coöperating with the latch member 23 is a second latch member 38 (Figs. 6 and 7) having a plurality of shallow notches 39 having rounded bottoms in which the teeth 25 on the latch member 23 are adapted to register in the position shown in Fig. 2, and a single deeper substantially V-shaped notch 40 between these notches which is more shallow than the notch 26 on the member 23 and opposite the same when the parts are in the position shown in that figure. This member 38 is held in position upon the bracket 22 by means of the pivot bolt 21 for the controlling member 20 and is additionally secured to this bracket by means of a suitable bolt or other attaching means 41 extending transversely therethrough at one side of the bolt 21, which coöperates with the pivot bolt to rigidly position the member 38.

The operation of the construction shown is as follows: When the parts are in the full line or neutral position shown in Fig. 3, wherein the clutch member 14 is out of engagement with both of the driven members 15 and 16, it is to be noted that the teeth 25 on the latch member 23 are received in the two shallow notches 39 on the latch member 38 on opposite sides of the notch 40. When the operator throws the controlling lever 20 forward to the left hand dotted line position shown in Fig. 3, that is, so that the clutch member 14 engages the friction surface 16, through the connection of this lever to the latch member 23 by the link 36, the latch is depressed to the lower dotted line position shown, wherein its upper tooth 25 is received in the central notch 40 of the latch member 38 and the upper inclined edge of this tooth rests against the upper inclined wall of the notch 40; the peak of the tooth being thus maintained out of engagement with the bottom of the notch 40. It is to be noted that during this movement, the member 23 moves backward through its slotted connection with the bracket 22, and as soon as its upper tooth has passed the nib between the upper notch 39 and the central notch 40 on the member 38, the spring 33 automatically snaps the latch member into the position shown and serves to hold the same securely in that position; the spring at the same time acting through the member 23, the rod 36, the bail 20 and the bolt 21 to hold the clutch member 14 against the coöperating frictional clutch face 16. When, however, the lever 20 is thrown backward about its pivot from its left hand dotted position to either the full line position shown or the extreme right-hand dotted line position shown, the latch member 23 yields to permit free movement of the lever, clicking into holding position at each step and thus retarding the operation of throwing the clutch member into positive engagement, as well as giving the operator a reminder by the increased force required to operate it as it passes out of the notches. It is to be noted that in the positive or forward position of the clutch member 14 the latch member 23 occupies the upper dotted line position shown in Fig. 3, wherein its lower tooth registers with the central notch in the coöperating latch member 38, this position being the reverse of its lower dotted line position, wherein the clutch member 14 is so connected as to drive the mechanism in a reverse direction. Obviously under emergency conditions, however, as when an operator is drawn into the machine, the power developed by the feeding mechanism and drawing him against the bail, being much greater than that exerted by an operator, would be sufficient to throw the lever 20 over to its frictional or reverse position very promptly; the spring 33 yielding and the lever clicking rapidly to reverse position in what would be in effect a single swift movement.

It is to be noted that the operating lever 20, while freely movable under emergency conditions, as, for instance, when it is desired to throw the clutch member from positive engagement to frictional engagement, is automatically positioned in the intermediate neutral position when moving in the reverse direction so that, should an operator attempt to throw the clutch from frictional engagement to positive engagement without allowing the mechanism to slow down, the increased effort required to move the controlling lever acts as a reminder to the operator and the positive connection of the clutch is also so delayed as to let the parts lower their speed to the desired degree. It is further to be noted that the latch or controlling mechanism also acts to securely position the clutch in any one of its three positions against accidental jars; the spring acting upon the member 23 to hold the teeth on the same snugly in position in the notch or notches on the member 38. Further, this spring acts at the same time to hold the movable clutch member in engagement with the coöperating clutch members in such a manner as to effectually prevent all slipping and make it unnecessary for the operator to hold the controlling lever in position even at high speeds.

In Fig. 8 I have illustrated a modified form of the construction in Figs. 1 to 7, wherein, instead of being disposed horizontally, as shown in the prior construction, the members 23 and 38 are disposed substantially vertically and connected through a modified connection with the clutch member 14. It is to be noted that in this construction the member 38 is rigidly attached at 41 to an upstanding member 42 pivoted at 43 to a transversely disposed frame member 44 carried on the main frame 2. The lower end of the member 42 is operatively connected to the clutch member 14 in such a manner as to act as a clutch shipping member therefor, this member extending downward and at an angle from the portion thereof carrying the latch member 38. In this construction the latch member 23 is carried on the lower end of the controlling lever 20 and is pivotally mounted on a brace or support 45 rigidly attached at its outer end to the frame. Obviously, the operation of this construction is substantially the same as that described in connection with the construction shown in Figs. 1 to 7, the lever 20 being movable into the three positions described and the members 23 and 38 coöperating in substantially the same manner, although the member 38 in this instance is moved angularly and the member 23 has only a limited movement about its pivot on the rod 45 as it passes over the nib on the member 38. This construction is particularly adapted to use in those connections wherein the driving mechanism is so arranged that access to the clutch mechanism is more readily obtained from the top of the driving mechanism, whereas the construction shown in Fig. 2 permits of the controlling mechanism being located at the side of the clutch mechanism and enables a more compact construction to be obtained.

While I have in this application described one embodiment which my invention may assume in practice, it is to be understood that the form shown herein for purposes of illustration may be modified without departing from the spirit of the invention.

What I claim as my invention and desire to secure by Letters Patent is:

1. In a clutch controller, a support, a plurality of clutch members thereon, a controlling member carried on said support and operatively connected to said clutch members, a latch member on said support, and a coöperating latch member angularly movable with respect to said latch member and yieldingly mounted on said support operatively connected to said controlling member.

2. In a clutch controller, a support, forward and reverse clutch mechanisms mounted thereon, an adjustable clutch adjusting member mounted on said support and operatively connected to said clutch mechanisms to selectively connect the same, a latch member fixed to said support, and an adjustable spring pressed coöperating latch member engaging therewith and movable with respect thereto by said adjusting member.

3. In a clutch controller, a support, a plurality of clutches mounted thereon, an adjustable clutch adjusting member for selectively connecting said clutches mounted on said support and operatively connected to said clutches, a latch member fixed to said support, and an angularly adjustable spring pressed latch member coöperating therewith and operatively connected to said clutch adjusting member.

4. In a clutch controller, a support, positive and frictional clutches mounted thereon, an adjustable clutch adjusting member for selectively connecting said clutches mounted on said support and operatively connected to said clutches, a notched latch member carried by said support, and an adjustable spring pressed toothed latch member coöperating with said notched latch member and normally engaging therewith operatively connected to said adjusting member.

5. In a clutch controller, a support, a plurality of clutch mechanisms mounted thereon, a lever mounted on said support controlling the connection of said clutch mechanisms and operatively connected thereto, a serrated latch member carried on said support, a coöperating latch member adjustably mounted on said support having teeth engaging the serrated face of said first mentioned latch member, and means transmitting the movement of said lever to said coöperating latch member.

6. In a clutch controller, a support, forward and reverse clutch connections, a lever carried on said support operatively connected to said clutches and controlling the connection thereon, a notched latch member fixed to said support, an angularly adjustable toothed latch member carried on said support, resilient means holding the teeth on said latch member in engagement with the notched surface of said first mentioned latch member, and means operatively connecting said angularly adjustable latch member to said lever.

7. In a clutch controller, a support, forward and reverse clutch connections, a lever carried on said support operatively connected to said clutches and controlling the connection thereon, a notched latch member fixed to said support, an angularly adjustable toothed latch member carried on said support, resilient means holding the teeth on said latch member in engagement with the notched surface of said first mentioned latch member, and a link connecting said angularly adjustable latch member with said clutch controlling lever.

8. In a clutch controller, a support, a plurality of clutches mounted thereon, a clutch controlling lever pivoted on said support, a latch member fixed to said support, said latch member having a deep central notch and shallow notches on the opposite sides thereof, a coöperating toothed latch member carried on said support, means normally holding the teeth thereon in engagement with the shallow notches on said fixed latch member, and means transmitting the movement of said controlling lever to said coöperating latch member.

9. In a clutch controller, a support, a shaft journaled thereon, a plurality of clutch driven members freely rotatable on said shaft, a clutch driving member carried on said shaft and adjustable to selectively engage said driven members, a clutch shipping member actuating said driving member, a controlling lever pivoted on said frame actuating said shipping member, a latch member carried by said frame, and a resiliently mounted latch operatively connected to said lever normally engaging with said first mentioned latch member and releasable therefrom on movement of said lever.

10. In a clutch controller, a support, forward and reverse clutch connections thereon, a controlling lever operatively connected thereto pivoted on said support, a serrated latch member fixed to said support, a toothed latch member pivotally mounted on said support and longitudinally movable about its pivot, resilient means normally holding the teeth on said movable latch member in engagement with the active surface of said serrated latch member, and means transmitting the movement of said controlling lever into an angular movement of said movable latch member.

11. In a clutch controller, a frame, a plurality of clutch connections mounted thereon, a lever pivoted on said frame operatively connected to said clutch connections to adjust the same, a fixed latch member carried on said frame, a movable latch member, means normally locking said movable latch member in engagement with said stationary latch member, and means operatively connected between said movable latch member and said coöperating latch member transmitting the movement of said lever to said latch member to lock said lever in a plurality of positions.

12. In a clutch controller, a support, forward and reverse clutch connections mounted thereon, a bracket fixed to said support, a controlling lever pivoted on said bracket and operatively connected to said clutch connections, a serrated latch fixed to said bracket at one side of said lever pivot, a coöperating toothed latch member pivoted on said bracket and longitudinally adjustable with respect thereto, resilient means normally holding said toothed latch member in engagement with said serrated latch member, and a link operatively connected to said lever and pivotally connected to said coöperating latch member at a point intermediate the pivot of said lever and the pivot of said latch member.

13. In a clutch controller, a support, a clutch mounted thereon, a controlling lever adjustably mounted on said support and operatively connected to said clutch, a latch member fixed to said support having a central notch and shallow notches on each side of the same, a movable latch member carried on said support having a plurality of peaked teeth, resilient means normally holding the teeth on said latch member in engagement with the shallow notches on said first mentioned latch member, and means actuated by said lever operatively connected between the same and said coöperating latch member swinging the latter about its pivot until one of the teeth thereon is received in the central notch on said first mentioned latch member.

14. In an ensilage cutter clutch controller, a frame, a plurality of clutches mounted thereon, a lever pivoted on said frame controlling the connection of said clutches, a latch member having a serrated face fixed to said frame, a second latch member having teeth thereon adapted to engage the serrations on said first mentioned latch member, said second latch member having a slot therein and being freely movable along its point of connection to said support, a spring normally holding said second latch member in engagement with said first latch member, and means operatively connected to said lever throwing said second latch member about its pivot upon movement of said lever.

15. In a clutch controller, a frame, a plurality of clutch connections mounted on said frame, a clutch controlling lever adjustably mounted on said frame and operatively connected to said clutch connections, a latch member carried on said support having a central notch therein and shallow notches on opposite sides thereof, an adjustable coöperating latch member mounted on said support and operatively connected to said lever having a central notch therein and rounded peaked teeth normally engaging the shallow notches in said first mentioned latch member, means transmitting the movement of said controlling lever to said coöperating latch member, and resilient means positioning one of the outer walls of the peaked teeth thereof in engagement with the walls of the central notch on said first mentioned latch member when said lever is moved about its pivot to throw said coöperating latch member out of its normal position.

16. In a clutch controller, a frame, a plurality of clutch connections mounted thereon, a lever pivoted on said frame controlling said clutch connections and operatively connected thereto, a latch member fixed to said frame having a serrated edge, a coöperating latch member pivotally attached to said frame having a toothed edge coöperating with the serrated edge of said fixed latch member, said coöperating latch member having a slot therein, and a laterally extending perforated lug on its non-working end, a pivot pin extending through the slot in said latch member and fixed to said frame, a bolt fixed to said pivot pin and protruding through the opening in said lug, a spring carried on said bolt, means positioning said spring between the end of said bolt and the outer wall of said lug, and a link pivoted to said coöperating latch member between the pivot of said controlling lever and the pivot of said latch member pivotally connected to said controlling lever.

17. In a clutch controller, a support, a shaft journaled thereon, spaced positive and frictional clutch members freely rotatable on said shaft, a movable clutch member selectively engaging therewith and rotatable with said shaft, a clutch shipping member actuating said movable member, a controlling lever pivoted to said support actuating said clutch shipping member, a latch member fixed to said support adjacent the pivot of said lever, said latch member having a plurality of notches thereon, a coöperating latch member carried on said support having a plurality of peaked teeth receivable in notches on said first mentioned latch member, said coöperating latch member being slotted to permit a longitudinal movement with respect to said support and having a lug on its end, means attaching said coöperating latch member to said support extending through said slot, a tension bolt operatively connected to said attaching means and guided by said lug, a spring carried on said tension bolt normally positioning the teeth on said coöperating latch member in engagement with the active surfaces of said first mentioned latch member, and a link pivoted to said coöperating latch member at one side of its pivot operatively connected to said controlling member.

In testimony whereof I affix my signature, in the presence of two witnesses.

NELS A. WIDGREN.

Witnesses:
G. M. MERWIN,
R. W. MARTIN.